United States Patent [19]

Shimizu

[11] Patent Number: 5,488,488
[45] Date of Patent: Jan. 30, 1996

[54] FACSIMILE MACHINE HAVING RECEIVED-IMAGE DISPLAY FUNCTION

[75] Inventor: Nobukazu Shimizu, Hino, Japan

[73] Assignee: Kabushiki Kaisha Toshiba, Kawasaki, Japan

[21] Appl. No.: 882,123

[22] Filed: May 13, 1992

[30] Foreign Application Priority Data

May 14, 1991 [JP] Japan .................... 3-136981

[51] Int. Cl.$^6$ .................................. H04N 1/00
[52] U.S. Cl. .................. 358/468; 358/401; 358/296; 345/202; 345/185
[58] Field of Search .................... 358/468, 401, 358/296, 400, 300, 442; 340/720, 723, 724, 727

[56] References Cited

U.S. PATENT DOCUMENTS

| 4,115,765 | 9/1978 | Hartke | 346/1 |
|---|---|---|---|
| 4,536,856 | 8/1985 | Hiroishi | 364/900 |
| 4,831,368 | 5/1989 | Masimo et al. | 340/720 |
| 5,030,944 | 7/1991 | Masimo et al. | 340/720 |
| 5,072,303 | 12/1991 | Silverberg | 358/296 |
| 5,095,372 | 3/1992 | Silverberg | 358/401 |
| 5,189,404 | 2/1993 | Masimo et al. | 340/720 |
| 5,229,758 | 7/1993 | Hsu | 340/723 |

Primary Examiner—Paul Ip
Attorney, Agent, or Firm—Finnegan, Henderson, Farabow, Garrett & Dunner

[57] ABSTRACT

A facsimile machine in which all of received image data are once stored in a memory and a necessary part of the stored image data is visually displayed on a display unit to confirm the necessity or non-necessity of its print-out and to selectively print out only the necessary part of the received image data. In the facsimile machine, in particular, the image to be visually displayed on the display unit can be reversed and rotated so that, even when the image is displayed as upside down, the image can be changed to its right display angle, whereby a user can conveniently confirm the image.

11 Claims, 6 Drawing Sheets

FIG.4(a) RAW DATA

FIG.4(b) VIDEO BUFFER STORAGE DATA PD

FACSIMILE MACHINE HAVING RECEIVED-IMAGE DISPLAY FUNCTION

BACKGROUND OF THE INVENTION

1. Field of the Invention

The present invention relates to a facsimile machine having a received-image display function in which all of received image data are once stored in a memory and a necessary part of the stored image data is visually displayed on a display unit to confirm the necessity or non-necessity of its print-out and to selectively print only the necessary part of the received image data.

2. Description of the Related Art

In these years, there has been suggested a facsimile machine having a received-image display function, in which all of image data received through a telephone line through a sending facsimile machine are once stored in a memory and a necessary part of the stored image data is visually displayed on a display unit to confirm the necessity or non-necessity of its print-out and to selectively print only the necessary part of the received image data.

In such a facsimile machine, when it is desired to display the received and stored image data on the display, the image is sequentially displayed on the display unit from its beginning part on a page-by-page basis.

For this reason, when the data of an original document to be transmitted is read out at the sending facsimile machine in a normal direction and transmitted, the image data received at the receiving facsimile machine is also stored in the image memory in the normal direction so that, even when the received data is displayed on the display unit, it can be displayed on the display unit in the normal direction. When the original document is read upside down at the sending facsimile machine and transmitted, however, the received image data becomes also stored in the image memory in an upside down relation so that such received data is displayed upside down on the display unit.

Even in the case where the original document image read upside down at the sending facsimile machine is received at the receiving facsimile machine, so long as the received data is printed out, the upside-down problem is not practically serious because a user can normally read the printed paper by setting it upside down.

Such a facsimile machine having a received-image display function can visually display desired part of the received image data on the display unit to previously confirm the necessity or non-necessity of its printout, but is inconvenient in that, when the image data of an original document is read upside down at the sending facsimile machine and transmitted, the received image data is displayed undesirably upside down on the display unit. In addition, whether or not the received image data is the one which is read at the sending facsimile machine in the normal direction, cannot be judged in the course of the reception and can be known only after the received data is actually displayed on the display unit. Of course, the image displayed upside down in this way is remarkably deteriorated in its visual recognizability and thus the convenience of the facsimile machine of the received-image display function is also greatly reduced.

In particular, when there is used a display unit of a type which cannot display the full one page of the received image data and can achieve it by scrolling operation or the like, such received upside-down document image as mentioned above will be displayed from its latter part of the page. For this reason, with such a facsimile machine having a received-image display function, when the receiver operator wishes to look at a destination name or sender name usually written at the beginning part of the facsimile transmission document, he must conduct scrolling operation because of its upside-down display, further increasing its inconvenience.

SUMMARY OF THE INVENTION

In view of such circumstances, it is an object of the present invention to provide a facsimile machine having a received-image display function in which a displayed image of received image data can be suitably rotated and even when the received image data is the one read at a sending facsimile machine in any direction, its visual recognizability can be secured.

In order to attain the above object, in accordance with an aspect of the present invention, a facsimile machine comprises constituent elements (a) to (e) which follow.

(a) An image memory for storing therein one case or a plurality of cases of image data received from another facsimile machine together with management data indicative of different files and pages.

(b) A video buffer for temporarily storing therein part of the image data stored in the image memory corresponding to one page specified based on the management data as a bit image data.

(c) Display means for visually displaying thereon the image data temporarily stored in the video buffer as a its storage page.

(d) Video buffer write control means for controlling writing operation of the image data specified to be temporarily stored in the video buffer to the video buffer.

(e) Input means for inputting a rotational display instruction to an image to be visually displayed on the display means.

In the facsimile machine, the video buffer write control means writes the specified one-page image data into the video buffer and when the rotational display instruction is input through the input means, exchange writing positions of pixels of the specified one-page image data to the video buffer in a predetermined manner to rotate the display of the image.

As a result, even in the event where the received image data stored in the image memory is to be read upside down at the sending facsimile machine and the image called for confirming the necessity or non-necessity of its printout is to be displayed upside down on the display means, that part of the image selected through user's operation of the input means (e) is again written in the video buffer in such a manner as to be rotated as mentioned above through the video buffer write control means (d) so that the user can observe an image displayed on the display means in the normal direction.

Further, even when there is used such display means of the type which cannot display the full one page of the received image data and can achieve it by scrolling operation or the like, such received upside-down document image as mentioned above, which would be displayed from its latter part of the page in the prior art, can be rotated within the video buffer through the user's operation so that the image can be displayed on the display means in the normal direction, that is, a destination name or sender name usually written at the beginning part of the facsimile transmission document can be first displayed. This means that there is a high possibility that the necessity or non-necessity of its printout can be confirmed necessarily without any intervention of the scrolling operation.

In the above case, the video buffer write control means (d) again reads the selected same image data from the image memory to again write the re-read data in the video buffer in such a manner as to rotate the image. However, the following arrangements for example may be employed.

(i) Two of first and second video buffers are provided for temporarily storing therein part of the image data stored in the image memory corresponding to one page specified based on said management data respectively as a bit image data.

(ii) Video buffer write control means controls writing operations of the image data to the first and second video buffers in such a manner that pixels of one page of the image data specified to be temporarily stored in the first and second video buffers have writing positions satisfying a mutual rotated relationship between the first and second video buffers.

(iii) Display change-over means is provided for performing switching between an output of the first video buffer and an output of the second video buffer to supply the video buffer output to the display means each time a rotational display instruction is input through the input means.

Alternatively, even when the single video buffer is provided:

(iv) Auxiliary buffer means having a storage capacity corresponding to at least two lines of the video buffer is provided.

(v) The video buffer write control means writes the specified one-page image data into the video buffer and when the rotational display instruction is input through the input means, for sequentially moving to the auxiliary buffer means each two lines located symmetrically with respect to a center of the image of the image data written in the video buffer while sequentially again writing the image data of the lines from the auxiliary buffer means to the video buffer to exchange the mutual positions of the line image data to thereby exchange writing positions of pixels of the specified one-page image data to the video buffer in a predetermined manner to rotate the display of the image.

With these arrangements, the re-reading operation of the image data form the image memory can be omitted and a processing efficiency for the aforementioned rotational display can be further increased.

Further, the rotational angle by the 'rotational display' is not restricted to 180 degrees. However, it is preferable from the viewpoint of its visual confirmation in some cases that the image rotation be 90 or 270 degrees depending on original documents to be transmitted. The present invention may be arranged so as to achieve the latter case. This can be readily coped with by arranging the manner (write address) in which the image data is written in the video buffer through the video buffer write control means.

DESCRIPTION OF THE PREFERRED EMBODIMENTS

Figure 1:
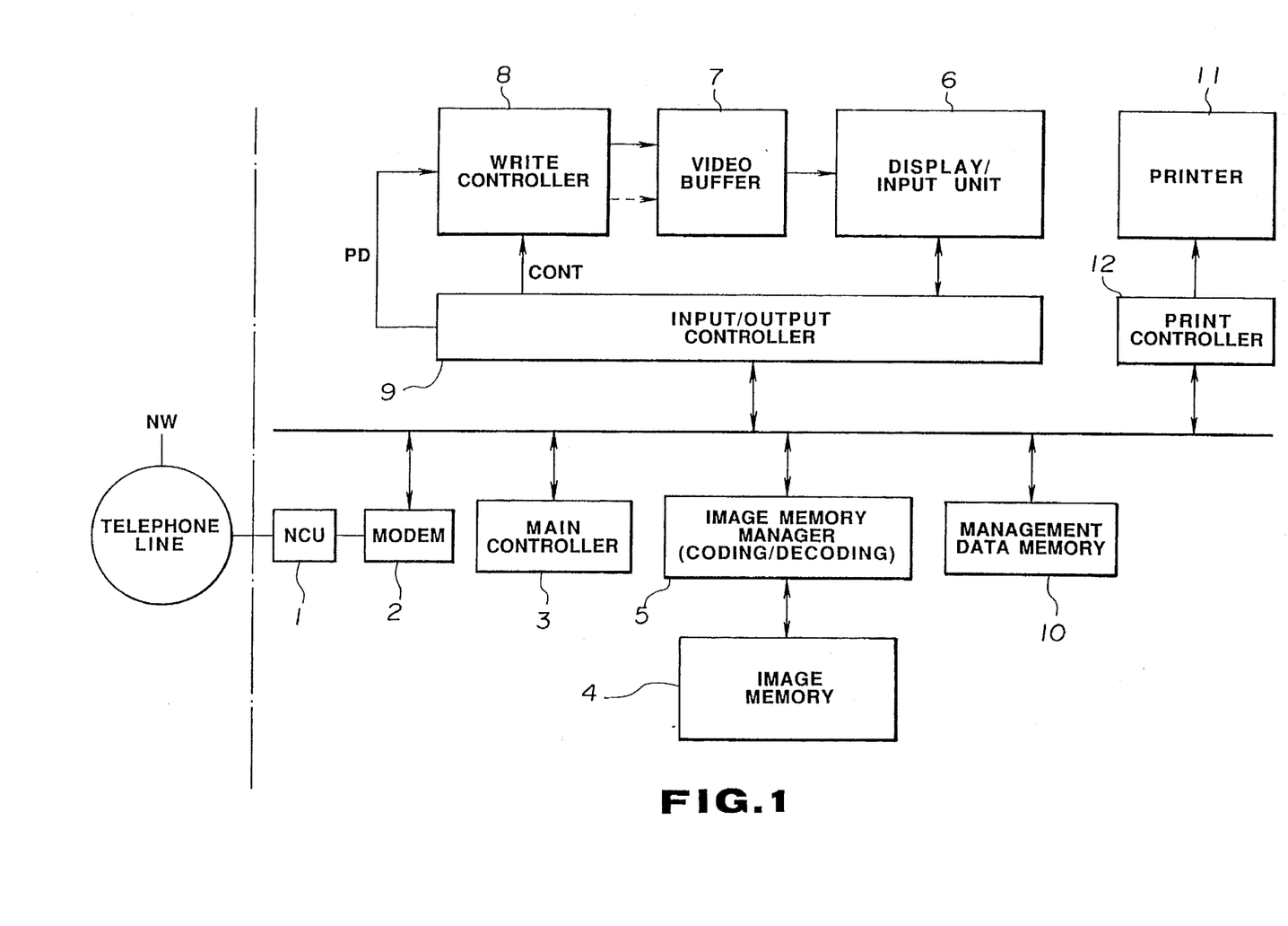
FIG. 1 is a block diagram of an arrangement of a facsimile machine having a received-image display function in accordance with an embodiment of the present invention.

Referring first to FIG. 1, there is shown a facsimile machine having a received-image display function in accordance with an embodiment of the present invention.

The facsimile machine illustrated in FIG. 1 includes a network control unit (NCU) 1 for seizing and releasing a telephone line NW, a modem 2 for carrying out modulation and demodulation over image data, a main controller 3 for performing general control over the respective parts of the facsimile machine, an image memory 4 for storing therein image data received at the facsimile machine, an image memory manager 5 for managing the writing operation of the image data demodulated at the modem 2 into the image memory 4 as well as the reading operation of the image data stored in the image memory 4, a display/input unit 6 having a display section such as a liquid crystal display for visually displaying thereon the image data stored in the image memory 4 and also having an input section through which a user enters various sorts of commands via his key operations, a video buffer 7 for temporarily storing therein the image data to be displayed on the display/input unit 6 as bit image data, a write controller 8 for controlling the writing operation of the image date specified to be temporarily stored in the video buffer 7, i.e., specified to be displayed on the display/input unit 6, into the video buffer 7, an input/ output controller 9 for providing the display and control data to the write controller 8 for control of the image display on the display input unit 6 and also for decoding the user command entered through the display/input unit 6 and transmitting it to the main controller 3, a management data memory 10 for storing therein such management data as an acceptation number or a communication record attached to the received image data, a printer 11 for printing out an image data specified to be printed on recording paper, and a print controller 12 for controlling the starting and other operations of the printer according to the command received from the main controller 3.

In operation, the image data received through the NCU 1 and demodulated at the modem 2 is taken into the facsimile machine usually as so-called raw data subjected to no compression. In this embodiment, in particular, when it is desired to store the image data into the image memory 4, the image data is subjected at the image memory manager 5 to re-encoding and compressing operations, for example, on a modified-modified READ (MMR) coding basis. As a result, the data storage efficiency of the image memory 4 can be remarkably increased. The storage structure of the thus-stored image data within the image memory 4 is diagrammatically shown in FIG. 2.

Figure 2:
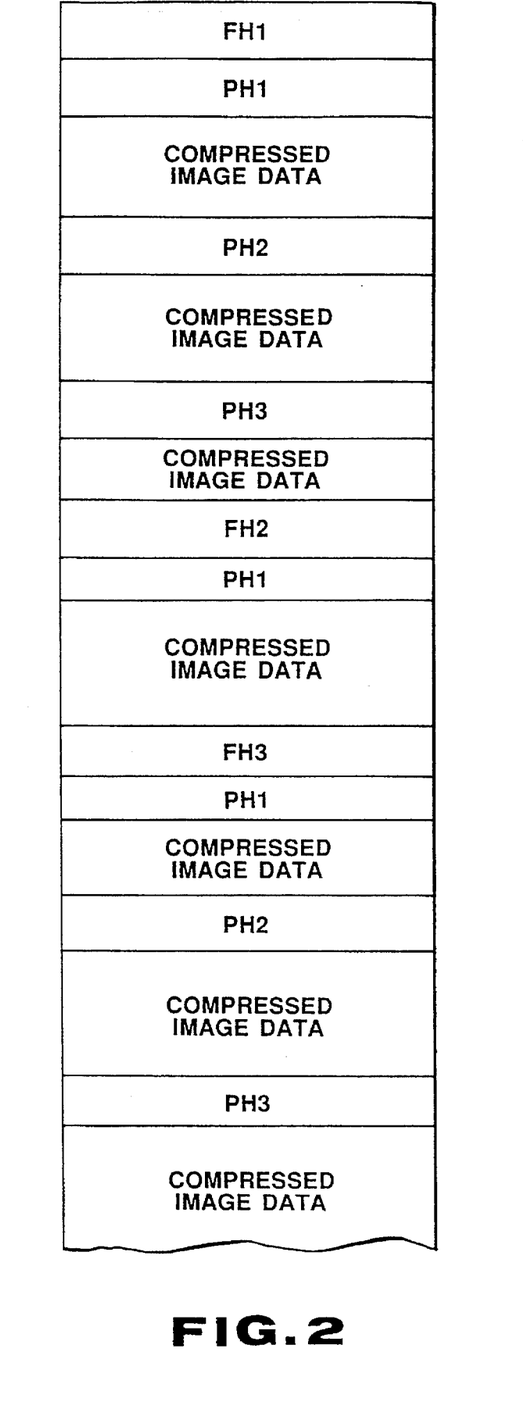
FIG. 2 schematically shows a storage state of an image memory in which a plurality of image data received at the facsimile machine are stored.

In FIG. 2, reference symbols FH1, FH2, . . . denote file headers associated with the aforementioned acceptation numbers, and symbols PH1, PH2, . . . denote page headers associated with the page numbers of each file. When it is desired to read out the image data specified by the user from the image memory 4, such file headers and page headers are referenced. Compressed image data for each file and page, when read out from the image memory, is decoded and decompressed or melted into raw data through the image memory manager 5.

Figure 3:
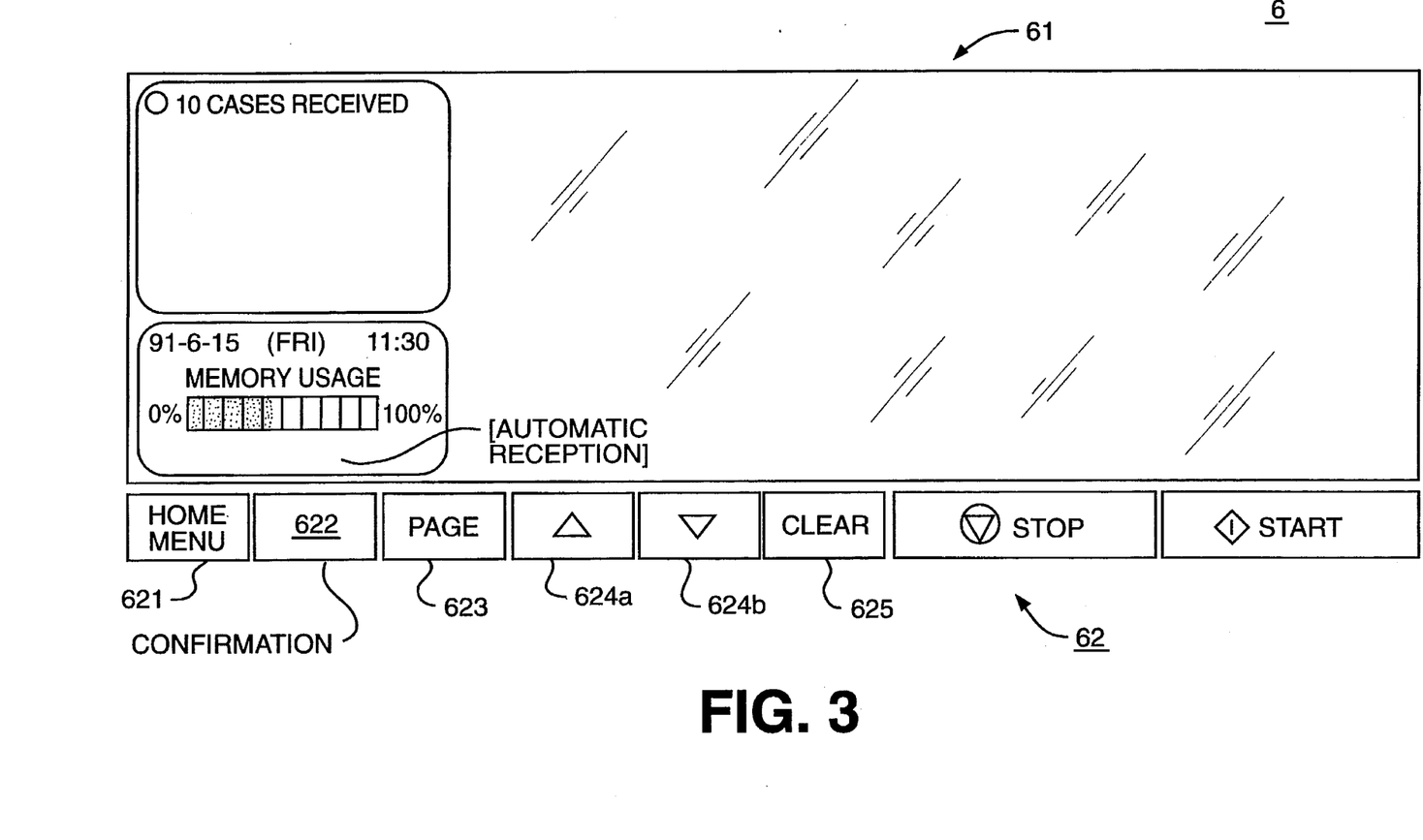
FIG. 3 shows an example of a display/input unit in FIG. 1.

Shown in FIG. 3 is an example of the aforementioned display/input unit 6. In FIG. 3, more specifically, reference numeral 61 represents a display section on which an image indicative of the received data specified by the user or various guidance data are visually displayed, and numeral 62 represents an input section having various sorts of operational keys arrayed therein. The operational keys arranged in the input section 62 include a home menu key 621 for instructing to indicate a menu of various functions executable in the facsimile machine on the display section 61, a confirmation key 622 for entering part of the contents of the home menu or the received-data list selected by the user, a page key 623 for instructing to change the page of the original document image being displayed on the display section, cursor keys 624a and 624b for scrolling the original document image being displayed on the display section 61 or for executing the selected data in the home menu or received-data list displayed on the display section 61, and a clear key 625 for instructing to releasing the command entered through the above keys or to erase a selected part of the specific received image data from the image memory 4. In the illustrated embodiment, in particular, the cursor keys 624a and 624b function as a rotary key for instructing the rotational display of the selected image to be explained later.

Figure 4A:
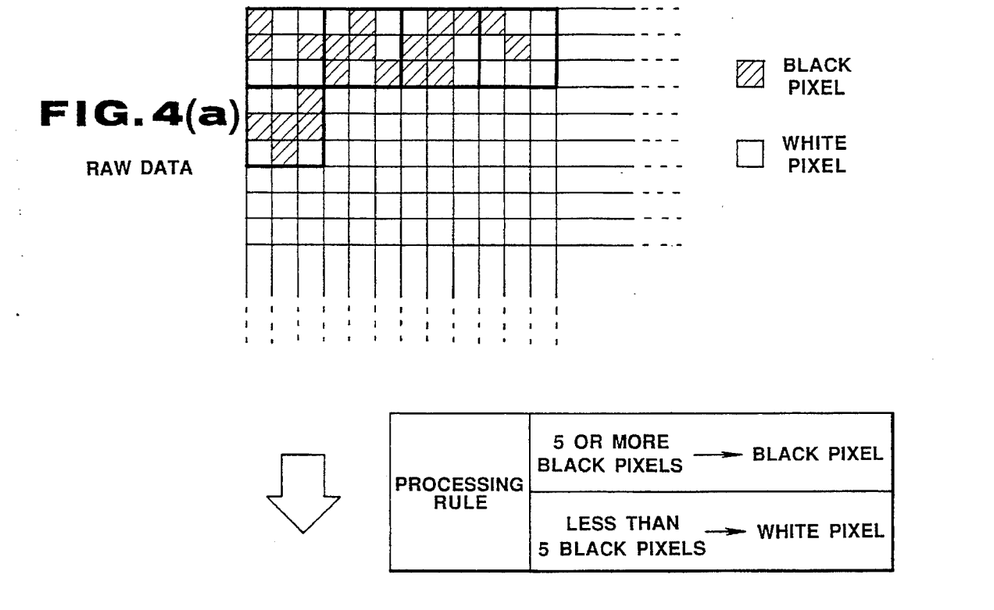
FIGS. 4(a) and 4(b) show schematic diagrams for explaining the concept of image-data decimating operation executed at an input/output controller in FIG. 1.
Figure 4B:
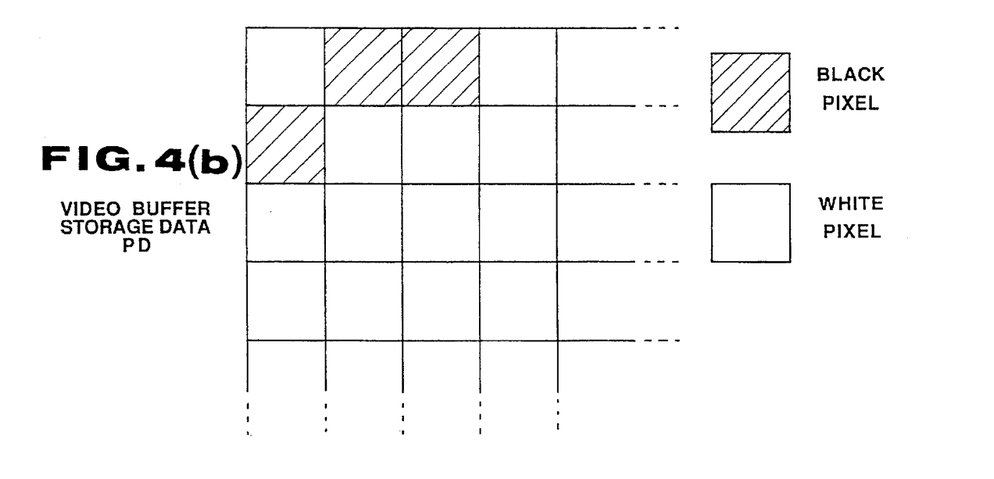

In the present embodiment, it is assumed that the display section 61 comprises 640 (wide) × 200 (long) dots in its displayable area and the video buffer 7 for temporarily storing therein the then display data on the display 61 has a capacity of, for example, 640 (wide) × 770 (long) bits. When an original document of a size of 216×297 mm, which is often used, is read into the facsimile machine with resolving powers of 8 dots/mm in the main scanning direction and 7.7 lines/mm in the sub scanning direction, image data corresponding to one page of the original document comprises 1728 (wide) ×2287 (long) dots (pixels). Accordingly, in order to collectively store the one-page image data into the video buffer 7 and to display it on the display 61, it is necessary to process such original document image data in some form. FIG. 4 schematically shows how to process such data in the present embodiment.

In more detail, in FIG. 4, FIG. 4(a) shows raw image data decoded and decompressed or melted through the image memory manager 5, while FIG. 4(b) shows how the processed image data are stored in the video buffer 7. It will be seen from comparison between FIGS. 4(a) and 4(b) that, in the present embodiment, the raw image data are divided into blocks each having 3×3 pixels, and a ratio between white and black pixels for each block is found and each block is regarded as an all-black or all-white pixel block according to the following conditions or rules. That is:

When there are 5 or more black pixels in a block, the block is regarded as an all-black pixel block.

When less than 5 black pixels are present in a block, the block is regarded as an all-white pixel block.

In this manner, each of pixels to be written at the pixel positions on the video buffer 7 is determined to be white or black with respect to each of the divided blocks. Therefor, the raw image data is reduced (thin-out) in the form close to an image indicative of the image data into ⅑, that is, into image data comprising 576 (wide) ×762 (long) dots, which results in that the reduced image data can be reliably stored into the video buffer 7 having a capacity of 640 (wide) ×770 (long) bits.

In the present embodiment, such data processing, i.e., ⅑ thin-out operation is carried out through the input/output controller 9 so that an image data PD subjected at the input/output controller 9 to the ⅑ thin-out operation is written into the video buffer 7 under control of the write controller 8.

The structures, functions and operations of the printer 11 and the print controller 12 are already well known and thus explanation thereof is omitted.

Detailed explanation will next be made as to the operation of the facsimile machine of the present embodiment of FIG. 1, in particular, as to the display processing operation of the received image data.

Assume now that the facsimile machine of the present embodiment receives image data via the telephone line NW from another facsimile machine (not shown) connected through the line NW to the former facsimile machine. Then the received image data is taken into the facsimile machine through the NCU 1.

The taken received-image data is once demodulated (decoded) through the modem 2, subjected at the image memory controller 5 to a re-coding operation based on such an MMR coding as mentioned above, and then written into the image memory 4 together with the aforementioned management data indicative of different files and pages (refer to FIG. 2). At this time, the management data attached to the image data is also separately registered also in the management data memory 10.

In this way, the image data is store in the image memory 4 and the associate management data is registered in the management data memory 10. Therefore, in the present embodiment, the then storage state of the image data and the signal reception data are transmitted through the main controller 3 to the input/output controller 9 and further to part of the display section 61 to be displayed as guidance data thereon, for example, in such a format as shown in FIG. 3. In this connection, the guidance data may include a list of an acceptation number, a party telephone number or ID data with respect to the received image data.

Assume now that the user issues a display command for the received image and selects a desired part of the image to be displayed through the input section 62 in FIG. 3. More specifically, assume for example that the user conducts the following operations.

The user operates the home menu key 621 to display a 'home menu' including an 'image display' menu.

The user operates the cursor key 624a or 624b to select the 'image display' menu and further operates the confirmation key 622 to determine the selected contents.

The user operates the cursor key 624a or 624b to select a desired part of a list of the received data newly displayed through the above operations, and further operates the confirmation key 622 to determine the selected contents.

Then the above user commands are decoded through the input/output controller 9 and then transmitted to the main controller 3.

The main controller 3, when receiving these commands, causes the image memory manager 5 to be activated on the basis of the management data already registered in the management data memory 10, so that the corresponding image data is read out from the image memory 4, decoded, decompressed or melted and then sent to the input/output controller 9 under control of the manager 5.

Figure 5A:
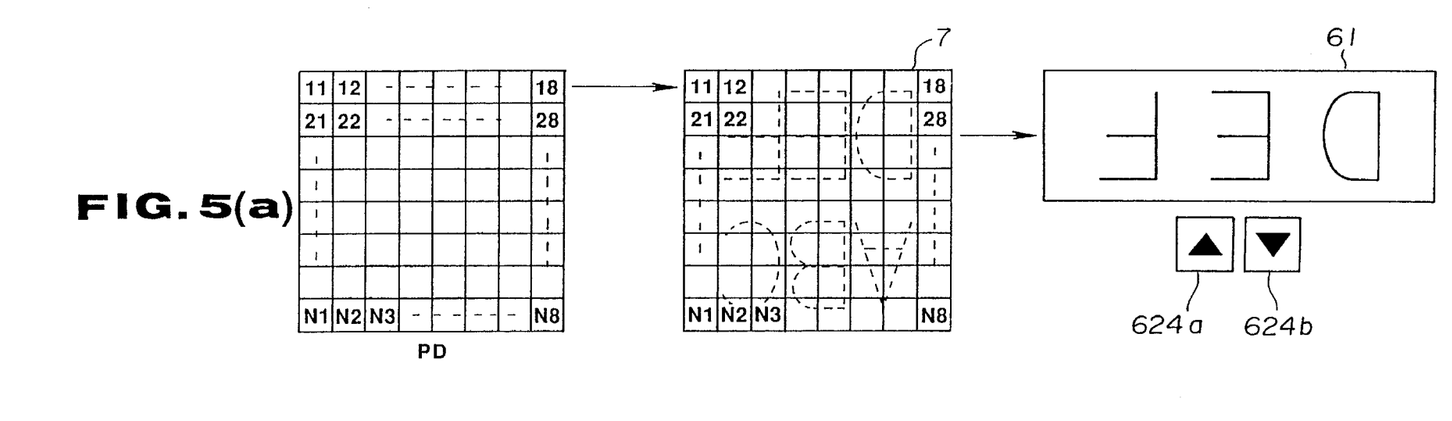
FIGS. 5(a) and 5(b) are schematic diagrams for explaining the operation of a rotational display function of the facsimile machine of the embodiment.
Figure 5B:
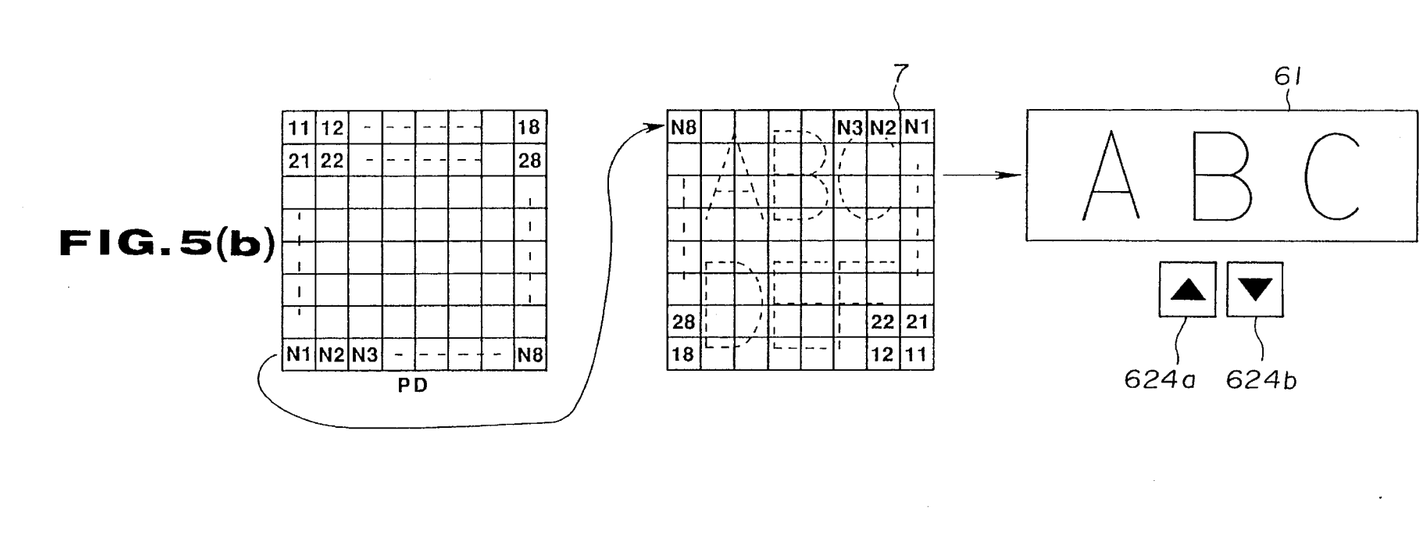

FIG. 5 shows diagrams for briefly explaining the operation of the input/output controller 9 when receiving the image data selected by the user and also the operation of the write controller 8. Explanation will be sequentially made as to the above operations of the input/output controller 9 and write controller 8 by referring to FIG. 5, as listed below.

(1) First, the input/output controller 9 subjects the received raw image data to data processing (thin-out operation) in such a manner as shown in FIG. 4, and then outputs the processed image data PD to the write controller 8.

(2) This causes the write controller 9 to write the received image data PD to the video buffer 7 in such a manner as shown in FIG. 5(a). In the illustrated example, the selected image data PD written in the video buffer 7 is supposed to have such a bit image having character strings of "ABC" and "DEF" both inverted and located upside down with a carriage return therebetween as shown in FIG. 5(a).

(3) This causes an image having exactly the same as that written in the video buffer 7 or more precisely part of the image to be displayed on the display section 61 in such a manner as shown in FIG. 5(a). In this case, when the user operates the cursor key 624b, this causes the display screen to be scrolled so that the user can confirm the other character "ABC" though it is similarly upside down.

(4) When the user simultaneously operates the cursor keys 624a and 624b to display such inverted image at its normal position, this causes the aforementioned 'rotational display' command to be issued so that the command is interpreted through the input/output controller 9 and then transmitted to the main controller 3. This causes the main controller 3 to again read the associated image data from the image memory 4 in accordance with the same procedure as stated above and again provide it to the input/output controller 9.

(5) The input/output controller 9, when again receiving the image data, subjects the received raw image data to a data processing in such a manner as shown in FIG. 4, and then outputs the processed image data PD to the write controller 8, as in the processing (1). However, at this time, the input/output controller 9 receiving the aforementioned 'rotational display' command also outputs to the write controller 8 an exchange control command CONT for instructing to exchange the write position of the associated image data PD to the video buffer 7.

(6) As a result, the write controller 8, this time, writes the image data PD into the video buffer 7 in such a manner as shown in FIG. 5(b), that is, in such a manner that the write positions of the pixels of one page of the image data PD in the video buffer 7 are exchanged to predetermined positions so as to rotate the image display.

(7) Thus, the image having exactly the same position as written in the video buffer 7 is displayed on the display section 61 at its normal direction as shown in FIG. 5(b) and the display starts with the character string "ABC". Even in this case, when the user operates the cursor key 624b as necessary, the display screen is scrolled so that the user can also confirm the latter character string "DEF" in its normal direction.

In this way, in accordance with the facsimile machine of the present invention, even if the received image displayed on the display screen to confirm the necessity or non-necessity of its print-out is upside down, the user can easily change the upside-down display to its normal-position one and thus can confirm it with high visual reliability.

Figure 6:
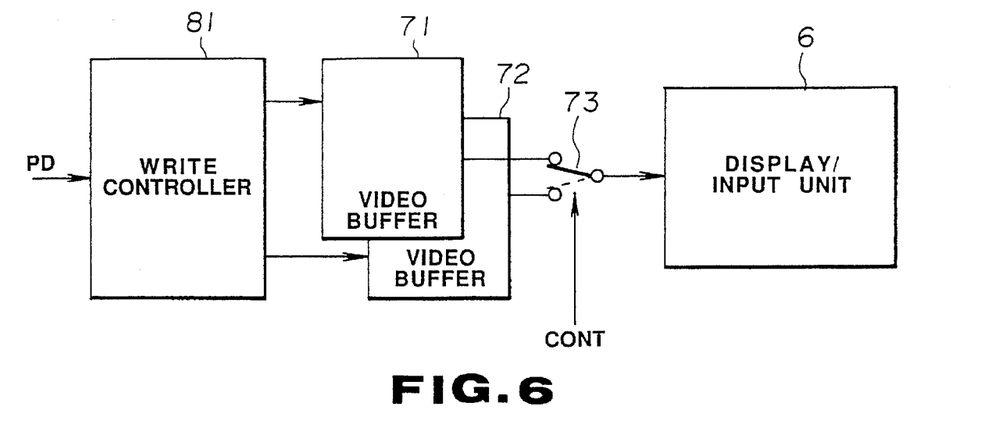
FIG. 6 is a block diagram of an arrangement of a major part of a facsimile machine having a received-image display function in accordance with another embodiment of the present invention.

The foregoing embodiment has been designed so that, when the user issues the 'rotational display' command, the associated image data is again read out from the image memory 4 and again written in the video buffer 7 in such a manner as cause the rotation of the image. However, the present invention may be designed, for example, as shown in FIG. 6, so that two of first and second video buffers 71 and 72 are provided respectively for separately temporarily storing therein one page of image data as bit image data like the above video buffer 7, a write controller 81 is provided for controlling the writing operations of the image data to the first and second video buffers 71 and 72 in such a manner that the write positions of pixels of the one-page image data in the first and second video buffers 71 and 72 have a mutual-rotated positional relationship between the first and second video buffers 71 and 72, a display switch 73 is provided for switching between an output of the first video buffer 71 and an output of the second video buffer 72 to be supplied to the display/input unit 6 (display section 61), whereby, each time the 'rotational display' command is issued, the input/output controller 9 for example controls the switching operation of the display switch 73.

With such an arrangement as shown in FIG. 6, the processing of again reading out the image data from the image memory 4 can be removed and thus a display time necessary for the 'rotational display' can be remarkably shortened.

Figure 7:
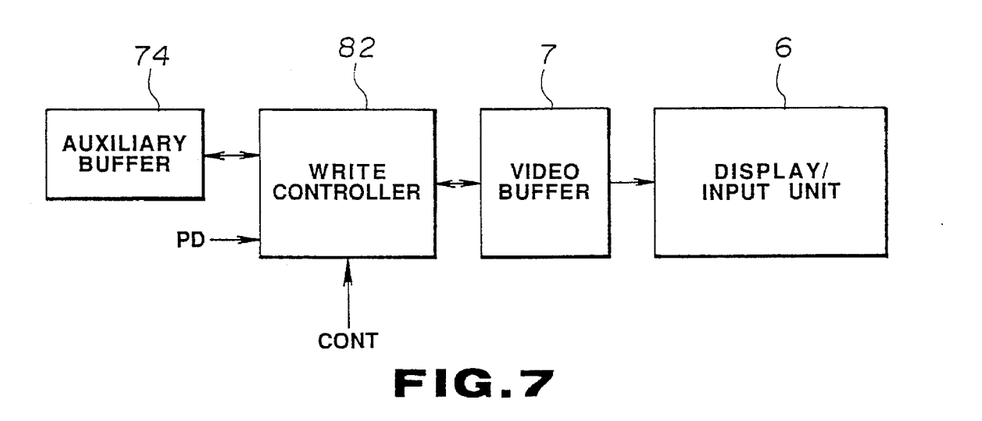
FIG. 7 is a block diagram of an arrangement of a major part of a facsimile machine having a received-image display function in accordance with a further embodiment of the present invention.
Figure 8:
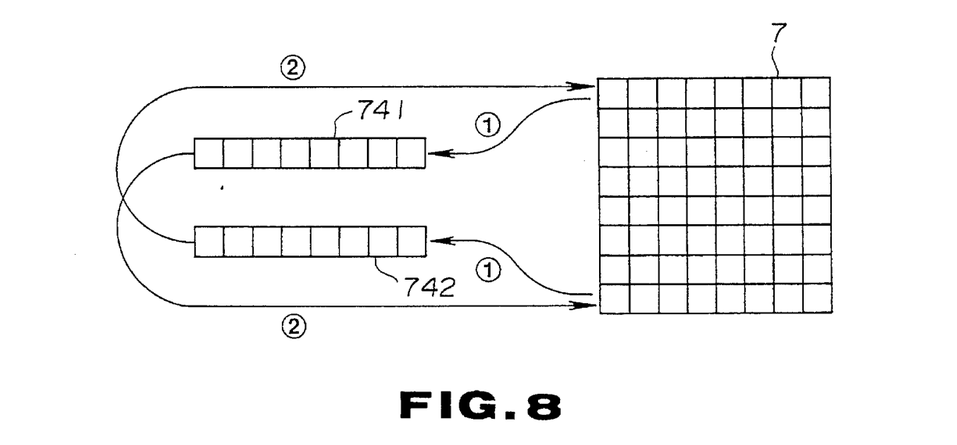
FIG. 8 is a schematic diagram for explaining the operational concept of the embodiment of FIG. 7.

Similarly, since an arrangement of FIG. 7 can eliminate the processing of again reading out the image data from the image memory 4, the arrangement of FIG. 7 is also valid.

In FIG. 7, more specifically, an auxiliary buffer 74 having a memory capacity corresponding to at least two lines of the video buffer 7 is newly provided in addition to the arrangement of FIG. 1, and a write controller 82 is provided so that, the write controller 82, when receiving the aforementioned exchange control command CONT from the input/output controller 9, sequentially moves each two lines located symmetrically with respect to the center of the image of the image data written in the video buffer 7 to the auxiliary buffer 74 (741, 742), again sequentially writes back from the auxiliary buffer 74 into the video buffer 7 for mutual position exchange of these line image data, whereby the positions of the pixels of the one-page image data temporarily stored in the video buffer 7 to be written in the video buffer 7 are exchanged in such a predetermined manner that the associated image is displayed as rotated.

Even in this case, the re-reading operation of the associated image data from the image memory 4 can be omitted basically with use of he single video buffer alone, though a display time necessary for the 'rotational display' is somewhat longer than that of the arrangement of FIG. 6.

Reference has been made only to the case where the direction of the image to be displayed is upside down or normal, i.e., rotational compensation by the 'rotational display' is 180 degrees in the foregoing embodiment. However, as mentioned above, it is preferable from the viewpoint of tis visual confirmation in some cases that the image rotation be 90 or 270 degrees depending on original documents to be transmitted. The present invention may be arranged so as to achieve the latter case. To this end, the display/input unit 6 is provided with a function of displaying key or guidance data for commanding the aforementioned effect, and the manner (write address) in which the image data is written in the video buffer through the write controller 8 (or 81 or 82) is modified according to such a command.

Although the 'rotational display' command has been entered by means of the simultaneous operation of the cursor keys 624a and 624b in the foregoing embodiments, such an arrangement may be allowed that a separate key for entering the 'rotational display' command as necessary, as a matter of course.

Further, from the consideration of restrictions in the capacity of the video buffer and the display size of the display unit, the image data stored in the image memory 4 has been decompressed, subjected to the thin-out operation of 1/(n×n) or ⅑ in the above case, and then sent to the video buffer in the foregoing embodiments. However, such thin-out operation is not always necessary in the present invention. For example, in the case where the video buffer capacity and the display size of the display unit are sufficiently secured, the decompressed or melted raw image data may be written in the video buffer or displayed at a 1:1 ration.

In this connection, when the thin-out operation is required but the display size of the display unit can be sufficiently secured, such a scrolling operation as mentioned above is not always required.

Furthermore, though image data to be stored the image memory has bene subjected to such re-coding as based on the MMR and then stored as compressed from the viewpoint of effective use of the image memory in the foregoing embodiments, the facsimile machine of the present invention is not necessarily restricted to such an arrangement. For example, in the case where an image data is tone display data, it is common practice to transfer the data as it is in the form of raw data, in which case the raw data is stored even in the image memory.

For the simplicity of explanation, the write controller 8 and the input/output controller 9 have been illustrated as separated, but they may be arranged as a single controller including additionally the main controller 3 and the image memory manager 5, as a matter of course.

What is claimed is:

1. A facsimile machine having a received-image display function, comprising:

an image memory for storing therein one case or a plurality of cases of image data received from another facsimile machine together with management data indicative of different files and pages;

a video buffer for temporarily storing therein part of the image data stored in the image memory corresponding to one page specified based on the management data as a bit image data;

display means for visually displaying thereon the image data temporarily stored in the video buffer as its storage image;

video buffer write control means for controlling writing operation of the image data specified to be temporarily stored in the video buffer to the video buffer; and input means for inputting a rotational display instruction with respect to an image to be visually displayed on the display means, wherein the video buffer write control means writes the specified one-page image data into the video buffer and when the rotational display instruction is input through the input means, exchanges writing positions of pixels of the specified one-page image data to the video buffer in a predetermined manner to rotate the display of the image.

2. A facsimile machine having a received-image display function as set forth in claim 1, wherein the video buffer has a pixel storage capacity of 1/(n×n) of the number of pixels corresponding to the specified one-page image data, and wherein the video buffer write control means divides the pixels of the specified one-page image data into blocks each having (n×n) pixels, finds a ratio between white and black pixels in each block, and determines according to the found ratio white or black or each pixel to be written at a pixel position on the video buffer with respect to each of the divided blocks.

3. A facsimile machine having a received-image display function as set forth in claim 2, further comprising image memory management means for attaching the management data to decoded/compressed data obtained by subjecting the image data received from another facsimile machine to a re-encoding/compressing operation, for storing the re-encoded/compressed data attached with the management data in the image memory, and when the image data is specified based on the management data, for decoding and decompressing the specified image data to obtain raw data and then providing the raw data to the video buffer write control means.

4. A facsimile machine having a received-image display function, comprising:

an image memory for storing therein one case or a plurality of cases of image data received from another facsimile machine together with management data, indicative of different files and pages;

first and second video buffers for temporarily storing therein part of the image data stored in the image memory corresponding to one page specified based on the management data respectively as bit image data;

display means for visually displaying thereon either one of the image data temporarily stored in the first and second video buffers as its storage image;

video buffer write control means for controlling writing operations of the image data to the first and second video buffers so that pixels of one page of the image data specified to be temporarily stored in the first and second video buffers have writing positions satisfying a mutual rotated relationship between the first and second video buffers;

input means for inputting a rotational display instruction with respect to an image to be visually displayed on the display means; and display change-over means for performing switching between an output of the first video buffer and an output of the second video buffer to supply a video buffer output to the display means each time the rotational display instruction is input through the input means.

5. A facsimile machine having a received-image display function as set forth in claim 4, wherein each of the first and second video buffers has a pixel storage capacity of 1/(n×n) of the number of pixels corresponding to the specified one-page image data, and wherein the video buffer write control means divides the pixels of the specified one-page image data into blocks each having (n×n) pixels, finds a ratio between the white and black pixels in each block, and determines according to the found ratio white or black of each pixel to be written at a pixel position on the video buffer with respect to each of the divided blocks.

6. A facsimile machine having a received-image display function as set forth in claim 5, further comprising image memory management means for attaching the management data to re-encoded/compressed data obtained by subjecting the image data received from another facsimile machine to a re-encoded/compressed data obtained by subjecting the image data received from another facsimile machine to a re-encoding/compressing operation, for storing the re-coded/compressed data attached with the management data in the image memory, and when the image data is specified based on the management data, for decoding and decompressing the specified image data to obtain raw data and then providing the raw data to the video buffer write control means.

7. A facsimile machine having a received-image display function, comprising:

an image memory for storing therein one case or a plurality of cases of image data received from another facsimile machine together with management data indicative of different files and pages;

a video buffer for temporarily storing therein part of the image data stored in the image memory corresponding to one page specified based on the management data as bit image data;

display means for visually displaying thereon the image data temporarily stored in the video buffer as its storage image;

video buffer write control means for controlling writing operation of the image data specified to be temporarily stored in the video buffer to the video buffer;

auxiliary buffer means having a storage capacity corresponding to at least two lines of the video buffer; and input means for inputting a rotational display instruction with respect to an image to be visually displayed on the display means, wherein the video buffer write control means writes the specified one-page image data into the video buffer and, when the rotational display instruction is input through the input means, for sequentially moving to the auxiliary buffer means each two lines located symmetrically with respect to a center of the image of the image data written in the video buffer while again sequentially writing back from the auxiliary buffer means to the video buffer to exchange the mutual positions of the line image data to thereby exchange writing positions of pixels of the specified one-page image data to the video buffer in a predetermined manner to rotate the display of the image.

8. A facsimile machine having a received-image display function as set forth in claim 7, wherein the video buffer has a pixel storage capacity of 1/(n×n) of the number of pixels corresponding to the specified one-page image data, and wherein the video buffer write control means divides the pixels of the specified one-page image data into blocks each having (n×n) pixels, finds a ratio between the white and black pixels in each block, and determines according to the found ratio white or black of each pixel to be written at a pixel position on the video buffer with respect to each of the divided blocks.

9. A facsimile machine having a received-image display function as set forth in claim 8, further comprising image memory management means for attaching the management data to re-encoded/compressed data obtained by subjecting the image data received from another facsimile having to a re-encoding/compressing operation, for storing the re-encoded/compressed data attached with the management data in the image memory, and when the image data is specified based on the management data, for decoding and decompressing the specified image data to obtain raw data and then providing the raw data to the video buffer write control means.

10. A facsimile machine having a received-image display function of once storing in a memory received image data corresponding to different pages and later reading out the image data to display it on a display means on a page-by-page basis, comprising:

input means for selectively inputting for each page a rotational display instruction with respect to an image to be visually displayed on the display means according to at least one of rotation degrees of 90°, 180°, and 270°; and image rotating means, when receiving the rotational display instruction through the input means, for converting display positions of pixels of the image data of a page to be displayed on the display means in accordance with the rotation degree.

11. The facsimile machine having a received-image display function as set forth in claim 10, wherein said rotation degree may vary from 0 to 180 degrees.

* * * * *